(12) United States Patent
Scharenbroch et al.

(10) Patent No.: US 7,777,778 B2
(45) Date of Patent: Aug. 17, 2010

(54) ILLUMINATION AND IMAGING SYSTEM AND METHOD

(75) Inventors: Gregory K. Scharenbroch, Kokomo, IN (US); Timothy J. Newman, Noblesville, IN (US); Andrew P. Harbach, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 1447 days.

(21) Appl. No.: 10/974,282

(22) Filed: Oct. 27, 2004

(65) Prior Publication Data
US 2006/0087582 A1    Apr. 27, 2006

(51) Int. Cl.
H04N 9/47       (2006.01)
H04N 7/18       (2006.01)

(52) U.S. Cl. .................. 348/78; 348/77; 348/143; 348/370

(58) Field of Classification Search ........... 348/208, 348/169, 170, 171, 77, 78, 143, 370; 382/103, 382/117, 115; 250/330, 559.05; 345/9
See application file for complete search history.

(56) References Cited

U.S. PATENT DOCUMENTS

| | | | |
|---|---|---|---|
| 5,661,455 A * | 8/1997 | Van Lente et al. ........... 340/525 |
| 5,686,987 A * | 11/1997 | Hewitt et al. ............. 356/237.1 |
| 5,801,763 A * | 9/1998 | Suzuki ........................ 348/77 |
| 5,854,537 A * | 12/1998 | Gotoh et al. .................. 315/82 |
| 5,867,587 A * | 2/1999 | Aboutalib et al. ........... 382/117 |
| 6,277,067 B1 * | 8/2001 | Blair ........................... 600/167 |
| 6,672,745 B1 * | 1/2004 | Bauer et al. .................. 362/545 |
| 6,872,901 B2 * | 3/2005 | Su et al. .................. 200/61.02 |
| 7,158,099 B1 * | 1/2007 | Berube et al. .................. 345/9 |
| 2003/0169213 A1 * | 9/2003 | Spero ........................... 345/7 |
| 2004/0170304 A1 * | 9/2004 | Haven et al. ................. 382/115 |
| 2004/0184282 A1 * | 9/2004 | Nishijima et al. ........... 362/516 |
| 2005/0100191 A1 * | 5/2005 | Harbach et al. ............. 382/103 |

OTHER PUBLICATIONS

"A Drowsy Driver Detection System for Heavy Vehicles" by Richard Grace et al., 0/7803-5086-3/98 © 1998 IEEE, pp. I36-1 through I36-8.
"Drowsy Driver Monitor and Warning System" by Richard Grace, International Driving Symposium on Human Factors in Driver Assessment, Training and Vehicle Design, Aug. 2001, 7 pages.
"Research On Vehicle-Based Driver Status/Performance Monitoring; Development, Validation, and Refinement of Algorithms for Detection of Driver Drowsiness," U.S. Department of Transportation, National Highway Traffic Safety Administration, Dec. 1994.

* cited by examiner

*Primary Examiner*—Lin Ye
*Assistant Examiner*—Euel K Cowan
(74) *Attorney, Agent, or Firm*—Jimmy L. Funke (57) ABSTRACT

A system and method are provided for actively illuminating and monitoring a subject, such as a driver of a vehicle. The system includes a video imaging camera orientated to generate images of the subject eye(s). The system also includes first and second light sources offset from each other and operable to illuminate the subject. The system further includes a controller for controlling illumination of the first and second light sources such that when the imaging camera detects sufficient glare, the controller controls the first and second light sources to minimize the glare. This is achieved by turning off the illuminating source causing the glare.

24 Claims, 8 Drawing Sheets

ILLUMINATION AND IMAGING SYSTEM AND METHOD

TECHNICAL FIELD

The present invention generally relates to imaging systems and, more particularly, relates to a system for illuminating and capturing images of a subject, such as a person's eye, in a manner that reduces glare and/or reflections.

BACKGROUND OF THE INVENTION

A variety of video imaging systems have been proposed for use on-board vehicles to monitor the driver and/or passenger (s) in the vehicle. Some proposed video imaging systems include one or more cameras focused on the driver of the vehicle to capture images of the driver's face. The images are processed to determine various facial characteristics of the driver including position, orientation, and movement of the driver's eyes, face, and head. Given the determined driver facial characteristics, such as the driver's eye positioning and gaze, vehicle control systems can provide enhanced vehicle functions.

One proposed vehicle control system can monitor one or both eyes of the driver and determine a condition in which the driver appears to be drowsy, and can initiate a countermeasure. Another proposed vehicle control system can also determine if the driver is distracted, and can act to minimize the distraction. Further, vehicle control systems can monitor the driver's eye gaze and control various vehicle systems, such as the radio and entertainment system, to provide enhanced control of such systems based on eye gaze monitoring.

In order to maximize the effectiveness of a vehicle imaging system during low ambient light conditions, such as night time operation, active light illumination may be required. Proposed approaches for illuminating the driver's face with light have included providing a light source generally focused on the driver's eye(s). Other proposed techniques for illuminating the driver's face employ multiple light sources at different wavelengths, arranged in a generally concentric ring, for generating a bright eye pupil and dark eye pupil effect. A further approach provides first and second light sources located on opposite sides of the camera to achieve light and dark eye pupil effects. One example of the aforementioned approach is disclosed in U.S. application Ser. No. 10/705, 541, filed on Nov. 11, 2003, which is hereby incorporated herein by reference.

Many conventional approaches that employ active light illumination suffer from drawbacks. In particular, when the illuminated subject passenger is wearing corrective lens eye glasses, the geometry of the corrective lenses of the eye glasses may reflect the infrared illumination therefrom onto the image acquired by the imaging camera. This reflection of the illumination source is generally seen as a glare on the subject's eye glasses. The resultant glare may occur at the regions of interest near the eye(s) of the subject, thus inhibiting the ability to recognize imaged features.

Relocation or repositioning of the light illumination source may modify appearance and location of the resultant glare; however, the optical advantage of the curvature of the corrective lenses generally imposes that a large relocation distance of the illuminator provides only a minor adjustment in the resultant position of the glare on the lenses. Thus, relocation of the illuminating source, particularly in a vehicle, may not adequately mitigate the disruptive glare. The glare problem is further aggravated in that nominal movements of the subject's head may shift the glare so that the glare again occludes the eye. In a vehicle eye monitoring system, nominal head movements should not result in interruption of the subject monitoring.

It is therefore desirable to provide for an effective method of actively illuminating the eye(s) of a subject person and generating images of the eye(s) to allow for enhanced eye monitoring, particularly for a person wearing corrective lens glasses in a vehicle. In particular, it is desirable to provide for a more cost effective system and method that minimizes or eliminates glare that may result from a reflection from a reflecting surface, such as a corrective lens.

SUMMARY OF THE INVENTION

In accordance with the teachings of the present invention, a system and method are provided for illuminating and monitoring a subject, such as one or more eyes. According to one aspect of the present invention, the system includes a video imaging camera orientated to generate images of a subject. The system also includes first and second light sources. The first and second light sources are offset from each other and are operable to illuminate the subject. The system further includes a controller for controlling operation of the first and second light sources such that when the imaging camera detects sufficient glare. The controller controls the first and second light sources to reduce the glare. This is achieved by turning off the illuminating source causing the glare.

According to another aspect of the present invention, the method includes the steps of arranging a video imaging camera to generate images of a subject, and arranging first and second light sources at first and second locations. The method also includes the step of illuminating the subject with the first light source and generating a first image of the eye when the subject is illuminated with the first light source. The method further includes the steps of detecting the presence of sufficient glare and controlling the first and second illuminators to reduce the light provided by the first light source when sufficient glare is detected.

Accordingly, the system and method effectively control first and second light illuminators in a manner to reduce glare that may be seen in a captured image so as to enhance the image processing eye recognition. The present invention is particularly useful for monitoring a subject passenger, such as a driver of a vehicle, wearing corrective lenses which can cause glare upon reflection of the illuminated light.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
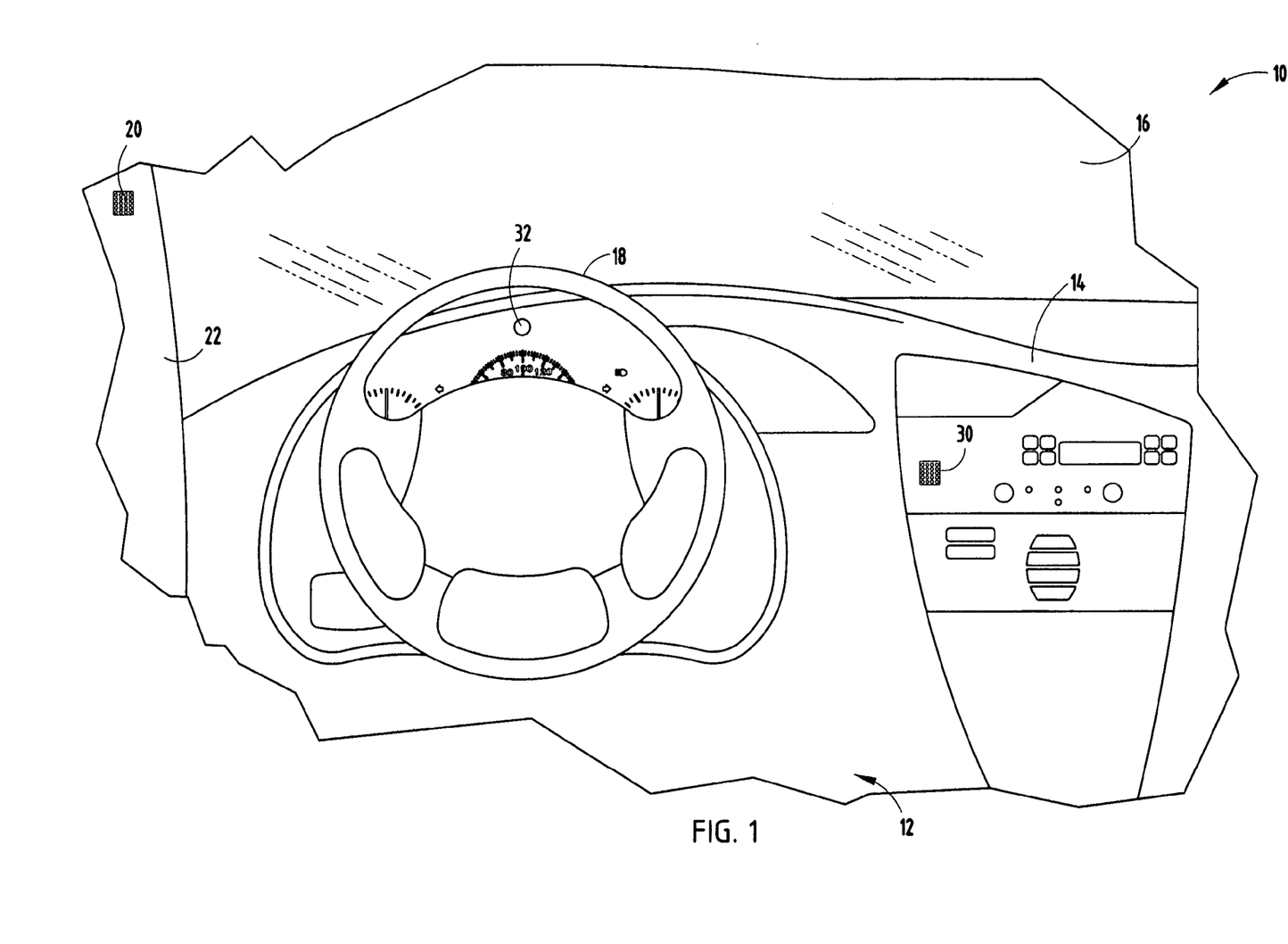
FIG. 1 is a front view of a vehicle passenger compartment equipped with an active illumination and imaging system according to the present invention.
Figure 2:
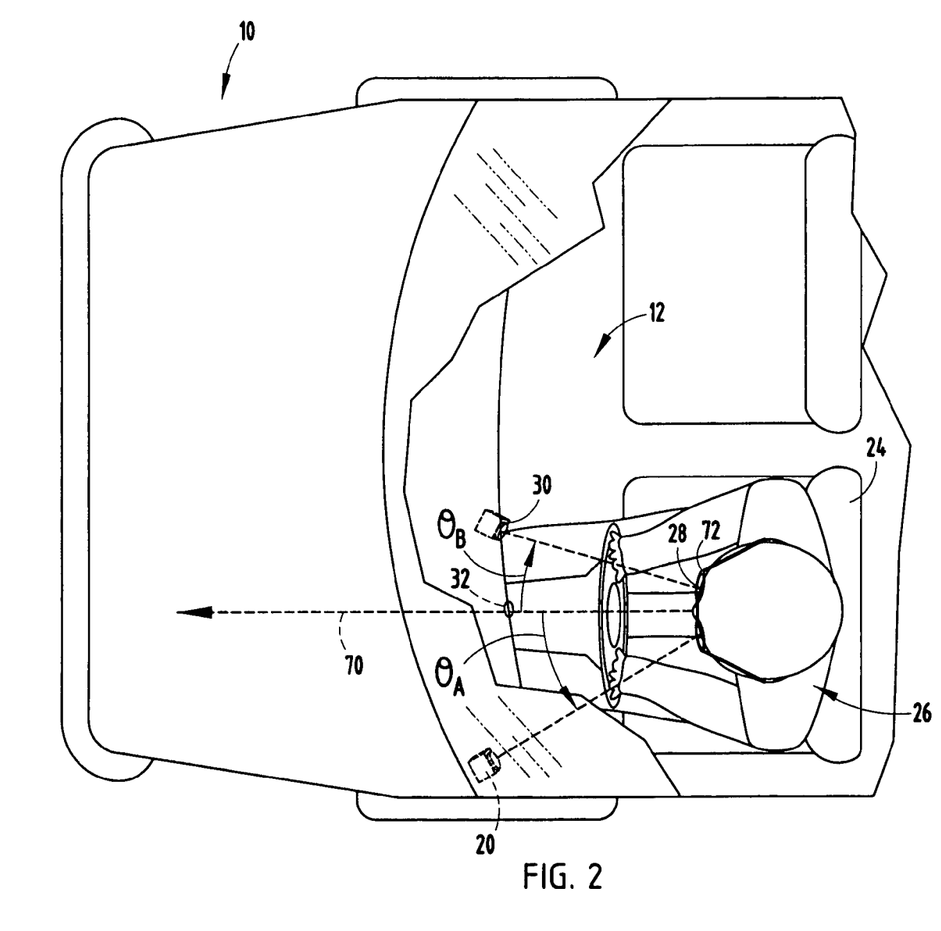
FIG. 2 is a top perspective view of the projection of the two IR illuminators toward the face of a subject driver of the vehicle.

Referring now to FIGS. 1 and 2, the passenger compartment (cockpit) 12 of a vehicle 10 is generally shown equipped with a pair of infrared (IR) illuminators and a video imaging camera 32 for illuminating and monitoring the head portion 26 of the subject driver of the vehicle 10. The vehicle passenger compartment 12 generally includes a dash 14 generally located in front of the driver and front passenger seats and below the front windshield 16. The vehicle dash 14 is generally forward of the steering wheel 18 and steering column and includes accessories, such as an instrument panel and other electronic devices.

Mounted in front of the driver's seat 24 generally in the upper region of the dash 14 is the video imaging camera 32 for acquiring video images of the subject driver's head 26, including the face and eyes 28, according to one embodiment. The imaging camera 32 is located and positioned sufficient to capture successive video image frames of the region where the driver's head 26 is expected to be located during normal vehicle driving. More particularly, the video imaging camera 32 captures at least a portion of the driver's head 26, particularly the face including one or both eyes 28 and the surrounding ocular features generally found in the area referred to as the ocular adnexa. While a single video imaging camera 32 is shown mounted in dash 14 generally directly in front of the subject driver of the vehicle 10, it should be appreciated the video imaging camera 32 may include one or more cameras mounted in any location suitable to capture images of the head 26 of a subject passenger in the vehicle 10.

Mounted within the passenger cockpit 12 of vehicle 10 are first and second infrared (IR) illuminators 20 and 30 for illuminating light onto the face of a subject passenger, such as the driver, so that lighted video images can be acquired by camera 32. Light illuminators 20 and 30 are independently controlled to provide enhanced active light illumination in a manner that minimizes glare. The first IR illuminator 20 is shown mounted on or near the driver's side A-pillar 22 of the vehicle 10. The second IR illuminator 30 is shown mounted on or in dash 14 generally in a region between the driver side and passenger side of the vehicle 10. The first and second IR illuminators 20 and 30 are shown positioned on opposite sides of the subject driver and both illuminators 20 and 30 are oriented to illuminate floodlight on the subject driver's face to enable the imaging camera 32 to acquire sufficiently lighted video images.

With particular reference to FIG. 2, the first IR illuminator 20 is located on or near the A-pillar at a lateral (side) angle $\theta_A$ from axis 70 which extends in the horizontal longitudinal axis of the vehicle 10 directly forward of the driver. The second IR illuminator 30 is located at a lateral angle $\theta_B$ from axis 70 on the opposite side of axis 70. Each of the lateral angles $\theta_A$ and $\theta_B$ is at least fifteen degrees (15°), according to one embodiment. According to one example, lateral angles $\theta_A$ and $\theta_B$ may be equal to approximately forty-six degrees (46°) and thirty-three degrees (33°). While the IR illuminators 20 and 30 are shown located on opposite sides of the head 26 of the subject driver of the vehicle 10, it should be appreciated that the IR illuminators 20 and 30 could be located at other locations on the vehicle 10 including the same side of the head 26 of the driver of the vehicle 10.

Figure 3:
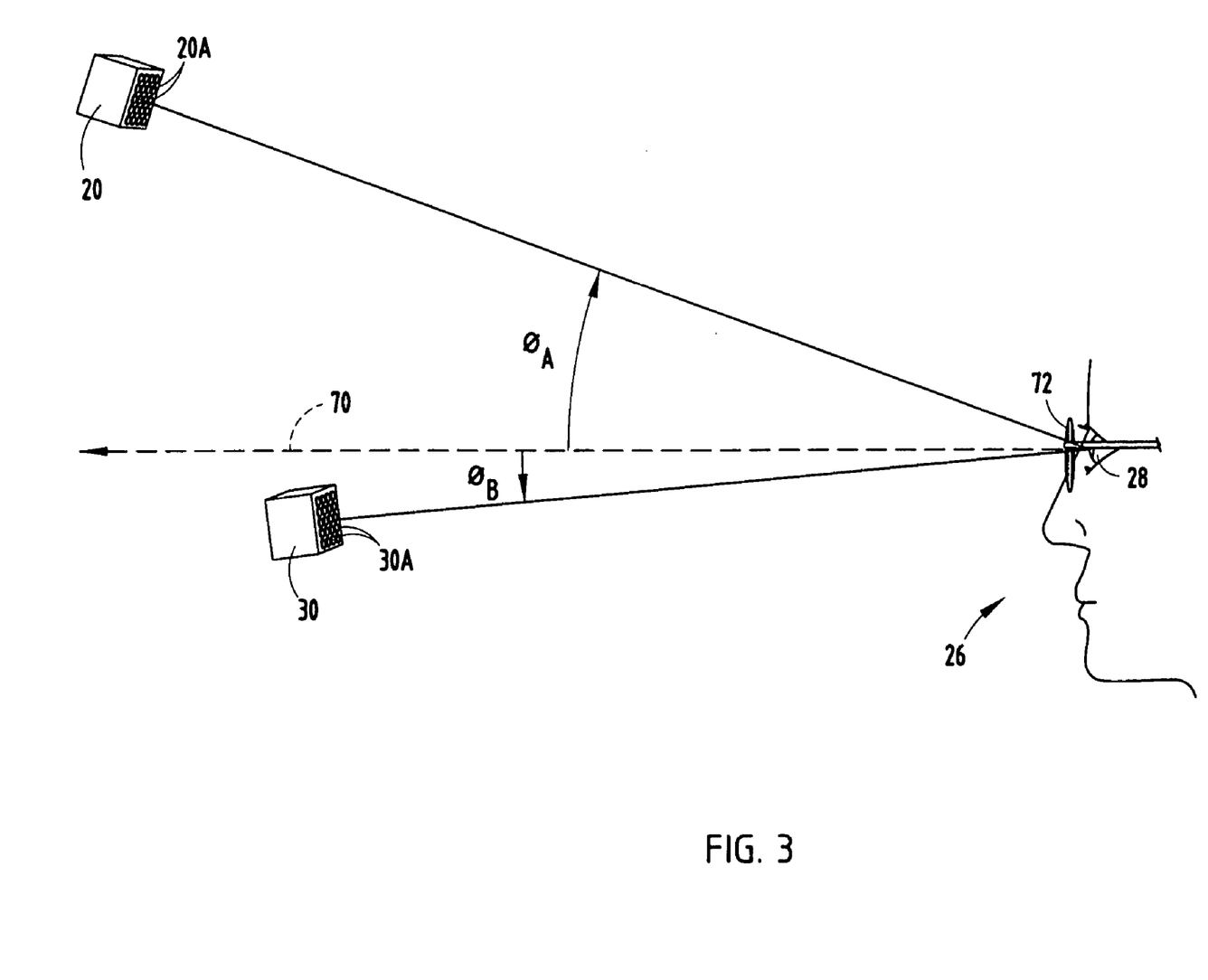
FIG. 3 is a side view of the two IR illuminators operable to illuminate the face of the driver.

Referring to FIG. 3, the first and second IR illuminators 20 and 30 are shown in a side elevational view having inclination angles $\phi_A$ and $\phi_B$ relative to horizontal longitudinal axis 70. The first IR illuminator 20 is located at an inclination angle $\phi_A$ relative to axis 70 of approximately twenty degrees (20°), while the second IR illuminator 30 is located at an inclination angle $\phi_B$ of approximately negative one degree (−1°), according to one example. However, it should be appreciated that the first and second IR illuminators 20 and 30 may be located at various other inclination angles $\phi_A$ and $\phi_B$.

The first and second IR illuminators 20 and 30 may include any of a number of light illumination sources for illuminating light on the face of the subject driver, sufficient for the video imaging camera 32 to acquire video images of the illuminated subject's face. In one embodiment, first and second IR illuminators 20 and 30 include an array of multiple light emitting diodes (LEDs) 20A and 30A, respectively. According to one example, the first and second IR illuminators 20 and 30 may include an array of twenty (20) LEDs 20A and twenty (20) LEDs 30A, respectively.

Figure 4:
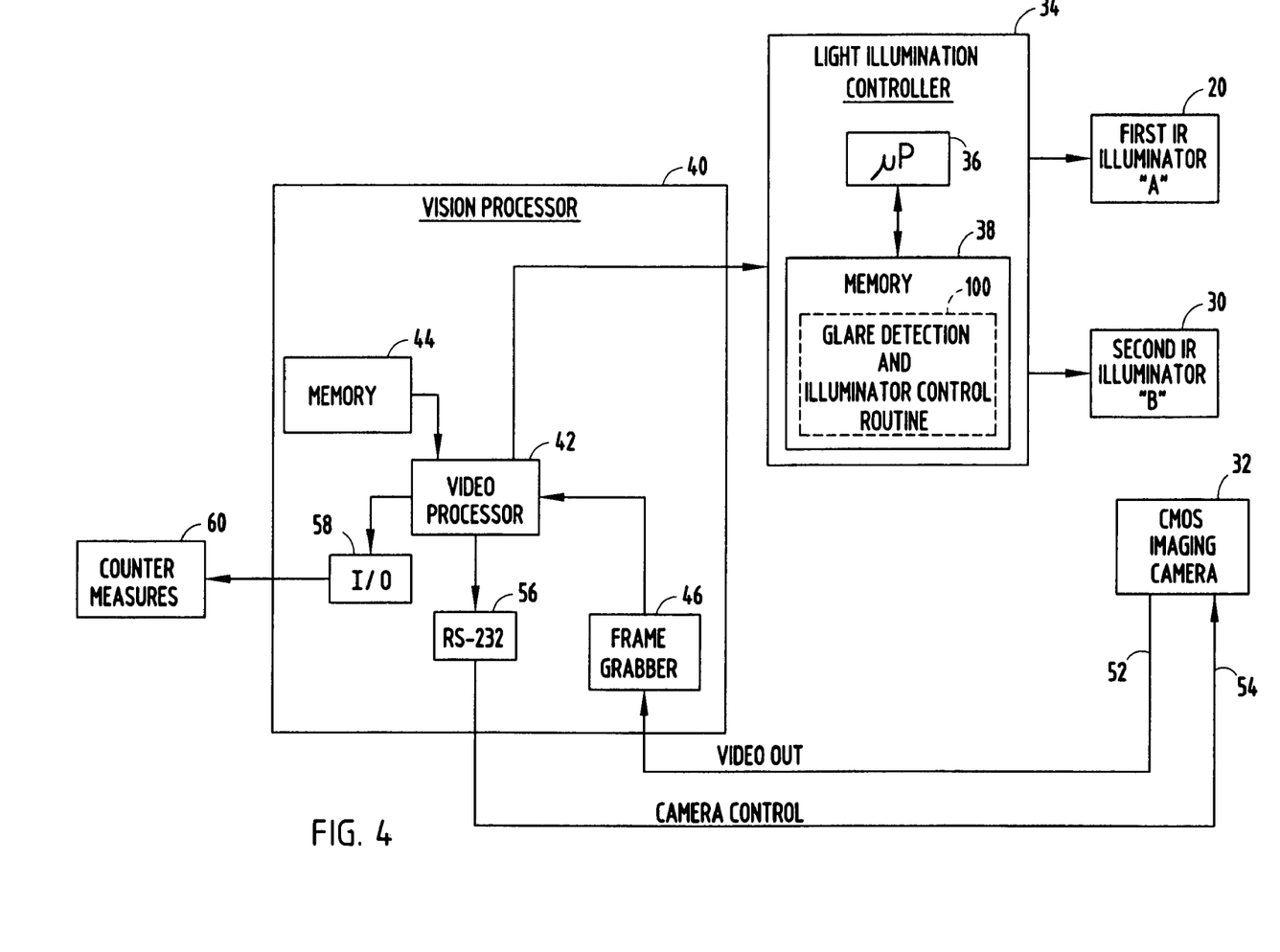
FIG. 4 is a block diagram further illustrating the illumination and imaging system according to the present invention.

Referring to FIG. 4, the active illumination imaging system is generally illustrated having a CMOS imaging camera 32, first and second IR illuminators 20 and 30, a light illumination controller 34, and a vision processor 40. The video imaging camera 32 may include a CCD/CMOS active-pixel digital image sensor. One example of the CMOS active-pixel digital image sensor is Model No. PP-0330, commercially available from Photobit, which has a resolution of about 640 H×480 V. It should be appreciated that other cameras, including less costly and less sophisticated video cameras, may be employed.

The vision processor 40 receives the captured video images from camera 32 on video output line 52. The vision processor 40 processes the captured images and determines the presence of glare in the captured images. The presence of glare can be determined by detecting brightness in the image. The vision processor 40 further provides a control signal to the light illumination controller 34 when the determined glare may inhibit identification of subject features.

The vision processor 40 includes a frame grabber 46 for receiving the video frames generated by the camera 32. The vision processor 40 also includes a video processor 42 for processing the video frames and memory 44, such as random access memory (RAM), read-only memory (ROM), and other memory as should be readily apparent to those skilled in the art. The video processor 42 is configured to perform one or more routines to identify one or more facial characteristics of the monitored subject driver and may make further determinations such as expected gaze vector of the driver, driver distraction, and driver drowsiness, for example.

The vision processor 40 also includes an input/output (I/O) port 58 shown providing outputs to countermeasures 60. The countermeasures 60 may include any of a number of control features such as may be found in a driver drowsiness system, driver distraction control system, and any other countermeasures that may utilize processed images from a video camera.

The vision processor 40 further generates camera control signals on line 54 which are sent via RS-232 56 to the imaging camera 32. The camera control signals allow for control of the video imaging camera 32. The camera control signals may include automatic adjustment of the pointing orientation of the video imaging camera 30. For example, the video imaging camera 32 may be repositioned to focus on an identifiable feature, and may scan a region in search of one or more identifiable features, including the subject's face and, more particularly, one or both eyes. The camera control signals may also include adjustment of focus and magnification as may be necessary to locate and track one or more identifiable features. Thus, the imaging system may automatically locate and track identifiable feature(s), such as one or both of the subject's eyes.

The light illumination controller 34 includes a microprocessor-based controller having a microprocessor 36 and memory 38. Memory 38 may include RAM, ROM, EEPROM, and other memory as should be evident to those skilled in the art. The controller 34 is programmed to include a glare detection and illuminator control routine 100 for controlling activation of the first and second IR illuminators 20 and 30 based on the detection of a sufficient amount of glare as described herein.

While a separate light illumination controller 34 and vision processor 40 are shown and described herein, it should be appreciated that the glare detection and illuminator control routine 100 may be implemented in the vision processor 40 or in any other controller having adequate processing capability. The vision processor 40 and light illumination controller 34 may be integrated together or may be implemented in separate hardware and/or software as shown.

The light illumination controller 34 provides control output signals to each of the first and second IR illuminators "A" and "B" 20 and 30 to control energization of the first and second illuminators 20 and 30. The controller 34 may control activation of one of the first and second illuminators 20 and 30 at a time in a manner to minimize or reduce adverse effects caused by glare. When one of the first and second illuminators 20 and 30 is turned on and causes glare from a reflective surface, such as a corrective lens, the controller 34 de-energizes the one IR illuminator causing the glare and energizes the other of the two IR illuminators.

According to one embodiment, the light illumination controller 34 alternates between the first and second IR illuminators 20 and 30 and, upon detecting glare when one of the illuminators is energized, the controller 34 energizes the other IR illuminator only. According to another embodiment, the light illumination controller 34 illuminates one of the first and second IR illuminators 20 and 30 and, upon detecting glare, switches to the other IR illuminator only. According to a further embodiment, the light illumination controller 34 illuminates both IR illuminators 20 and 30 and, upon detecting glare, turns off the glare causing illuminator. This independent control of the IR illuminators 20 and 30 results in a reduction of the glare that may otherwise be present in captured images that are processed by the vision processor 40.

Figure 5A:
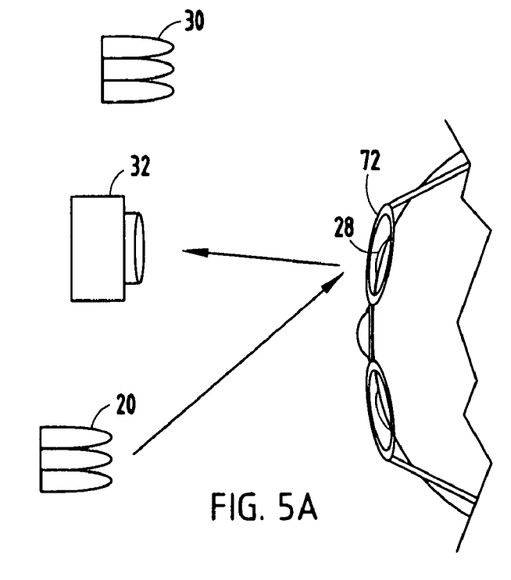
FIG. 5A is an exemplary top view illustrating illumination of the subject face with the first IR illuminator.
Figure 5B:
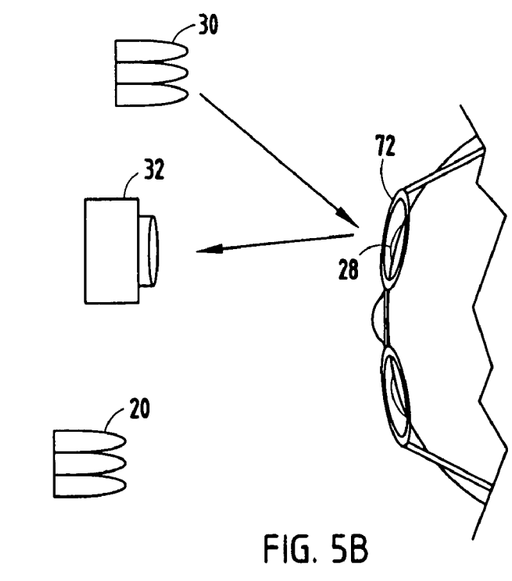
FIG. 5B is an exemplary top view illustrating illumination of the subject face with the second IR illuminator.
Figure 6A:
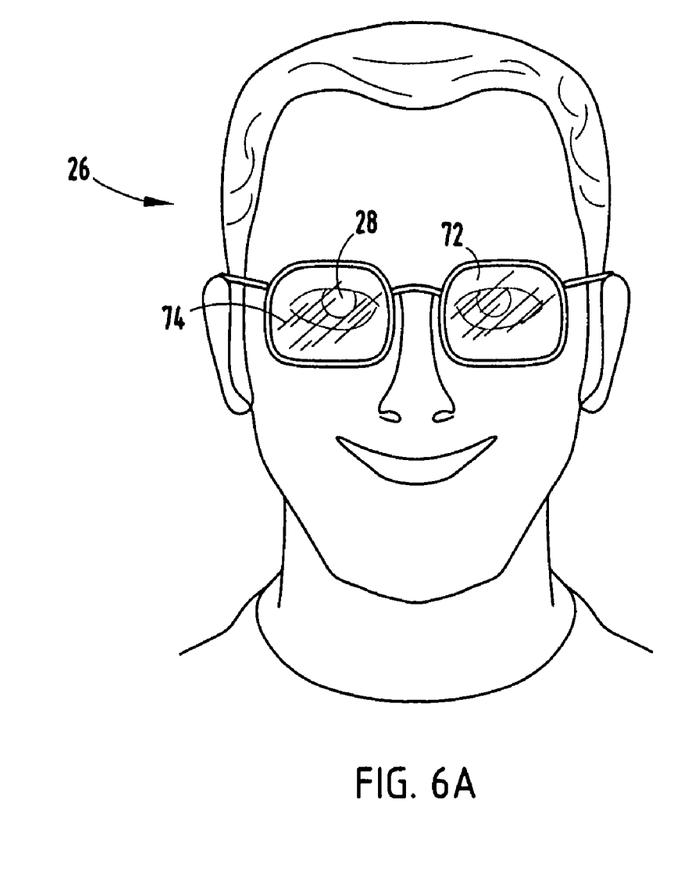
FIG. 6A is a front view of the driver's face illustrating glare resulting from light reflection from the corrective lenses when illuminated by the first IR illuminator.
Figure 6B:
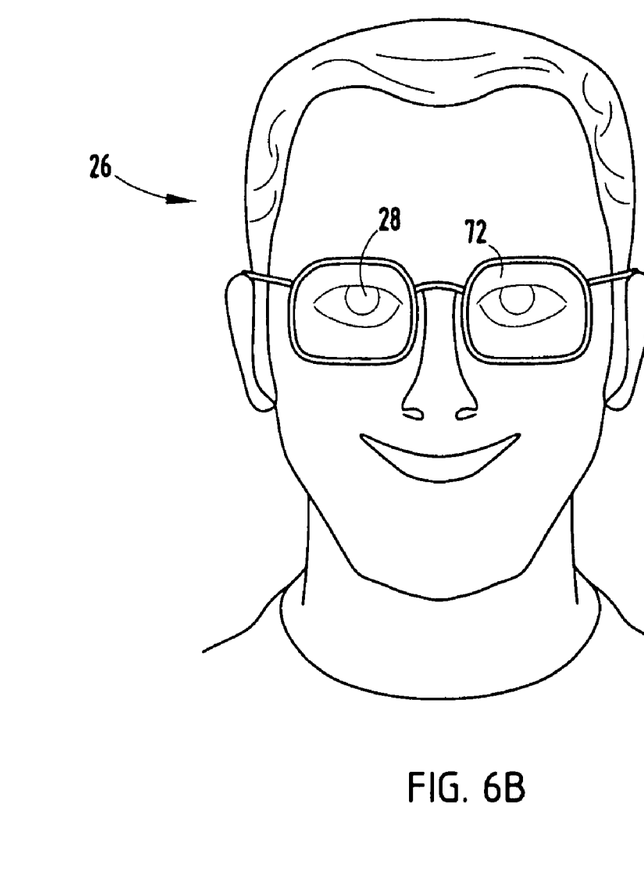
FIG. 6B is a front view of the driver's face illustrating the lack of glare when illuminated by the second IR illuminator.

Light illumination of the subject's face by the first and second IR illuminators 20 and 30 is illustrated in FIGS. 5A and 5B. An example of captured images of the subject's face when illuminated with and without glare is illustrated in FIGS. 6A and 6B. In FIG. 5A, the first IR illuminator 20 is turned on (energized) to illuminate light on the subject head of the driver of the vehicle. The first IR Illuminator 20 illuminates the subject's head in the area of the eyes 28, including the corrective lenses 72 worn by the subject driver. Images of the illuminated subject's head are then captured with the imaging camera 32. In the example shown, illumination by the first IR illuminator 20 results in a glare 74 as shown in the captured image of FIG. 6A. The presence of glare 74 prohibits or reduces the ability to process images and identify facial characteristics of the subject driver.

When glare 74 is detected, the light illumination controller 34 switches to turn on the second IR illuminator 30 and turns off the first IR illuminator 20 as shown in FIG. 5B. Energization of the second IR illuminator 30 only illuminates the head portion of the subject driver including the corrective lenses 72 worn in front of the eyes 28 to enable the camera 32 to capture images of the subject's head. With the second IR illuminator 30 turned on and the first IR illuminator 20 turned off, an image as shown in FIG. 6B is captured by camera 32 without the presence of any glare.

By locating the IR illuminators 20 and 30 at different locations, particularly on opposite sides of the subject's head 26, controlled activation of the IR illuminators 20 and 30 reduces the amount of glare that may otherwise interfere with processing of the captured image. As the subject driver's head 26 is rotated in one direction away from the forward line of sight (axis 70), there may exist two regions of glare occlusion with corrective lenses 72 before the driver's head 26 is turned ninety degrees (90°) forward. Since one side of the face of the driver's head 26 moves away from the imaging camera 32, any resultant glare spot will move further away from the eye 28 and eventually off of the corrective lens 72. Thus, the one side of the driver's face, as long as it is visible to the imaging camera 32, will generally present a glare-free view of the eye 28.

The other side of the face, which is turned toward the imaging camera 32, may have a glare spot moved inward which can eventually cover the eye 28. At this first region of occlusion (i.e., left illuminator with left lens or right illuminator with right lens), the driver's head 26 is oriented away from the offending illuminator. By removing the offending illumination source (e.g., 20), the alternate illuminator (e.g., 30) may provide coverage to the driver's face with both eyes 28 not being occluded by a glare spot 74. Thus, in the first occlusion region, the alternate illuminator will provide glare-free illumination of both eyes 28.

As the subject's head 26 is rotated through the occlusion region, it may enter into the second occlusion region wherein the IR illuminator left on casts a glare on the eye 28 as it crosses near the forward centerline (i.e., left illuminator on right lens or vice versa). In this situation, two possibilities may be available for monitoring the eyes 28. One eye 28 is still illuminated and may be visible to the imaging camera 32. If the offending (glare causing) IR illuminator is switched off and the other illuminator is turned back on, the driver's face will be illuminated but the glare may not be present. This is because the occlusion from the source exists at the first occlusion region and the glare has moved off the corrective lens 74 in the second occlusion region.

Finally, as the head is rotated past the second occlusion region, there may be no further glare reflections experienced in a typical lens reflection scenario. Due to the symmetry of the subject's face and glasses, the first and second occlusion regions exist as the head is rotated laterally in the opposite direction, and any resulting glare 74 may be dealt with in the same way described above.

Figure 7:
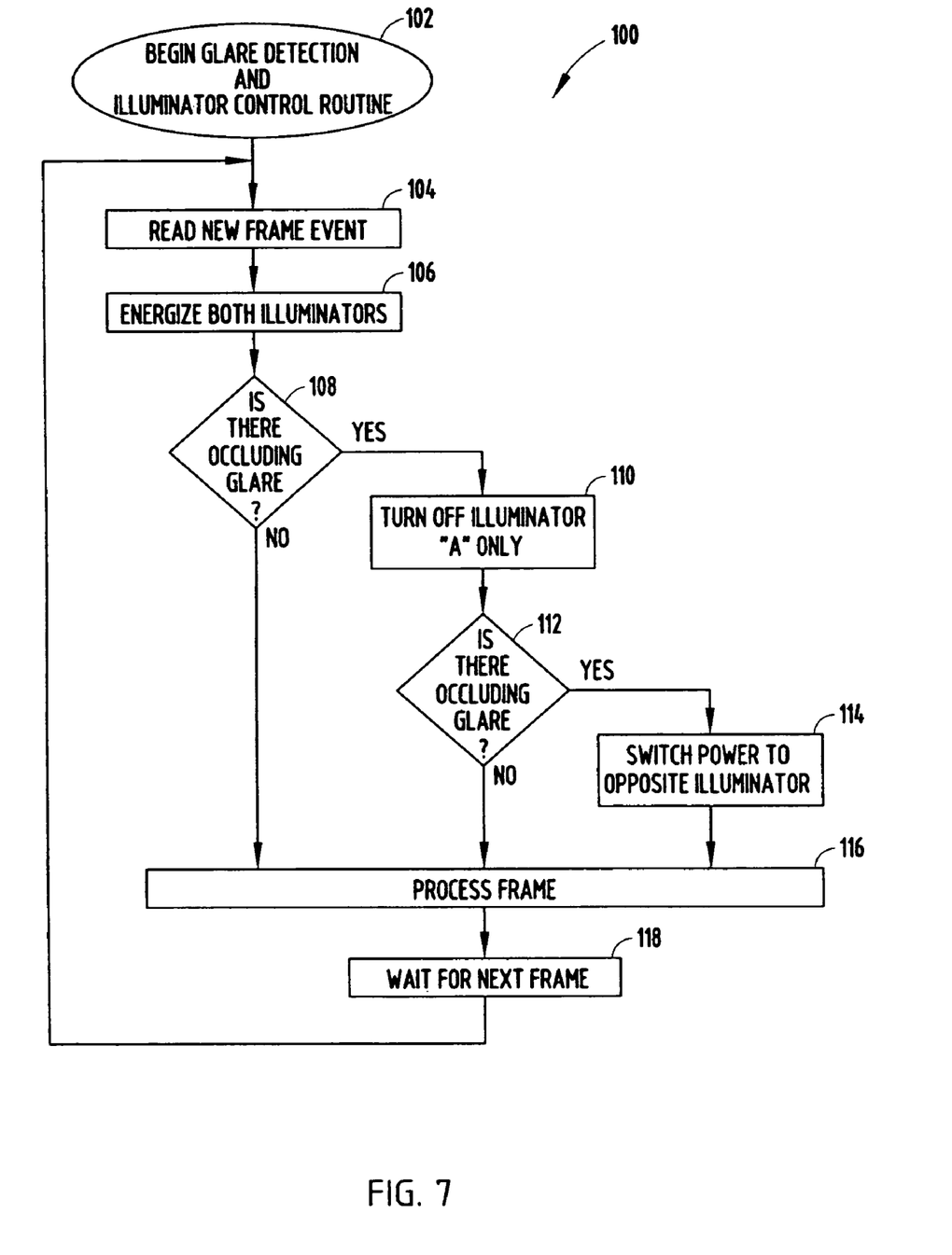
FIG. 7 is a flow diagram illustrating a routine for detecting glare and controlling the first and second IR illuminators according to a first embodiment of the present invention.

Referring to FIG. 7, a glare detection and illuminator control routine 100 is illustrated for independently controlling activation of the first and second illuminators in a manner that minimizes the adverse effects of glare in the captured video images. The control routine 100 illuminates both the first and second IR illuminators and, upon detecting glare of a sufficient magnitude, turns off the IR illuminator causing the glare, according to a first embodiment.

Control routine 100 begins at step 102 and proceeds to read the new video frame event in step 104. Next, in step 106, routine 100 energizes both the first and second IR illuminators. Thus, both the first and second IR illuminators are activated together at the same time.

With both IR illuminators turned on, control routine 100 determines if sufficient occluding glare is detected in step 108. If sufficient occluding glare is detected in step 108, routine 100 proceeds to step 110 to turn the first IR illuminator "A" off. Thus, the second IR illuminator "B" remains on.

With the first IR illuminator "A" turned off and the second IR illuminator "B" turned on, routine 100 proceeds to determine if there is sufficient occluding glare in step 112. If there is sufficient occluding glare detected, routine 100 switches power to the opposite IR illuminator in step 114. Thus, the second IR illuminator "B" is turned off and the first IR illuminator "A" is turned on. Thereafter, control routine 100 proceeds to process the current video frame in step 116 before waiting for the next new video frame in step 118 and then returning to step 104.

If there is not sufficient occluding glare detected in either of decision steps 108 and 112, control routine 100 proceeds to process the current video frame in step 116. Thereafter, routine 100 waits for the next video frame in step 118 and then returns to step 104. Accordingly, control routine 100 advantageously turns off the IR illuminator causing the glare.

Figure 8:
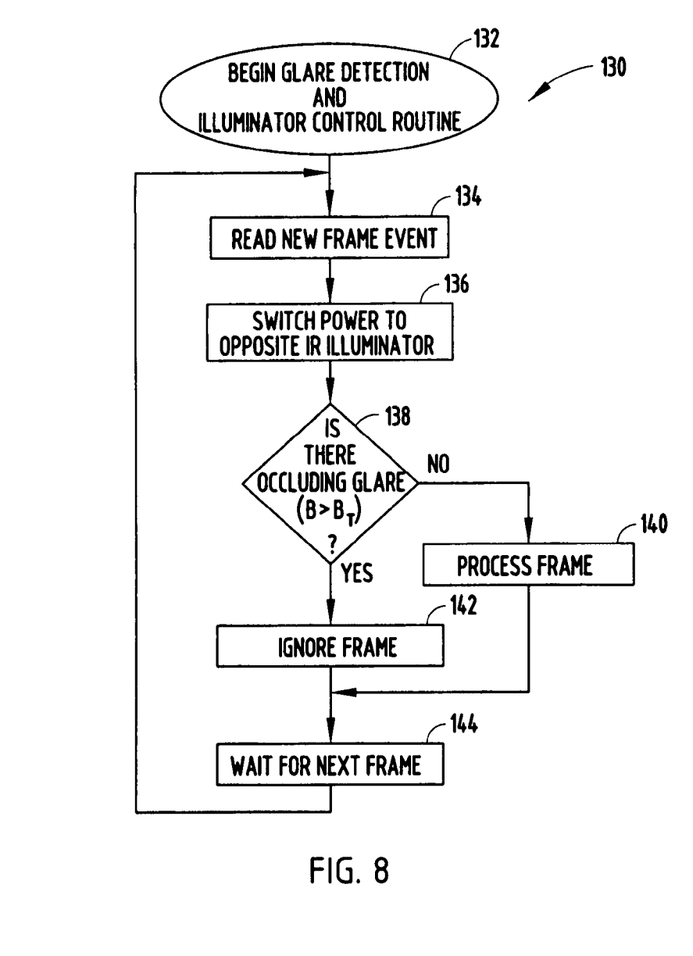
FIG. 8 is a flow diagram illustrating a routine for detecting glare and controlling the first and second IR illuminators according to a second embodiment.

Referring to FIG. 8, a glare detection and illuminator control routine 130 is illustrated according to a second embodiment for detecting glare and independently controlling the first and second illuminators 20 and 30 to reduce the presence of glare. Routine 130 begins at step 132 and proceeds to read a new frame event of the captured images in step 134. In step 136, routine 130 switches power to the opposite IR illuminator. In decision step 138, routine 130 determines if there is an occluding glare present. An occluding glare can be detected if the brightness B is greater than a threshold brightness $B_T$, according to one example.

If there is occluding glare detected, routine 130 ignores the current frame in step 142, and then proceeds to wait for the next frame in step 144 before returning to step 134. If there is not sufficient occluding glare detected in step 138, routine 130 proceeds to process the current frame in step 140, and then waits for the next frame in step 144 before returning to step 134. Accordingly, glare detection routine 130 processes captured images in the frame data and processes the frame data only when there is no sufficient occluding glare that interferes with the image recognition.

Figure 9:
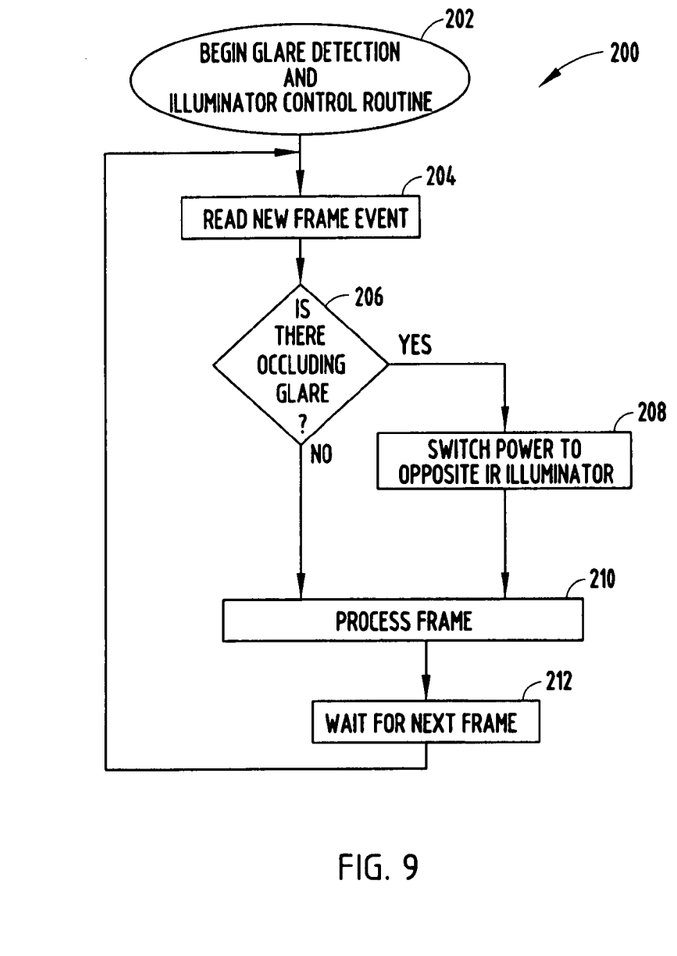
FIG. 9 is a flow diagram illustrating a routine for detecting glare and controlling the first and second IR illuminators according to a third embodiment.

Referring to FIG. 9, a glare detection and illuminator control routine 200 is illustrated according to a third embodiment. The control routine 200 turns on one of the first and second IR illuminators and, upon detecting glare of a sufficient magnitude, turns off the IR illuminator causing the glare and activates (turns on) the other IR illuminator.

Control routine 200 begins at step 202 and proceeds to read a new video frame event in step 204. In decision step 206, routine 200 determines if there is sufficient occluding glare present in the captured image. If there is sufficient occluding glare, routine 200 switches power to the opposite IR illuminator in step 208, and then proceeds to process the current frame data in step 210. If there is not sufficient occluding glare, routine 200 processes a current video frame in step 210. Following processing of the current video frame, routine 200 waits for the next video frame in step 212 before returning to step 204. The alternate glare detection routine 200 switches the power between the first and second IR illuminators only when an occluding glare is detected when one of the IR illuminators is turned on, so as to reduce the effects of glare and to advantageously improve the image recognition.

Accordingly, the active illumination and imaging system of the present invention advantageously controls illumination of a subject to enhance acquisition of video images of the illuminated subject. When glare, such as a reflection off of a corrective lens, is present, the system and method of the present invention control light illumination to turn off the illumination source that may cause the presence of glare. This allows for enhanced illumination in an imaging system, which is particularly advantageous for use in a vehicle where a subject driver of the vehicle may be wearing a corrective lens and the driver's head may be moving. While two IR illuminators 20 and 30 are shown and described herein, it should be appreciated that the illumination and imaging system and method may employ two or more light illuminators.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. An active illumination imaging system for monitoring a subject, said system comprising:
   a video imaging camera oriented to generate images of a subject;
   a first light source located at a first location and operable for illuminating the subject;
   a second light source located at a second location and operable for illuminating the subject; and
   a controller for processing the images generated with the video imaging camera during illumination of the subject and controlling operation of the first and second light sources, said controller detecting presence of sufficient glare based on a threshold brightness and controlling activation of the first and second light sources to reduce the glare when the presence of sufficient glare is detected from an eye region of the subject, wherein the controller turns off one of the first and second light sources in response to the detection of sufficient glare to reduce the glare.

2. The system as defined in claim 1, wherein the subject comprises an eye.

3. The system as defined in claim 2, wherein the system is employed in a vehicle for monitoring the eye of a driver of the vehicle.

4. The system as defined in claim 1, wherein the video imaging camera has an imaging axis and the first and second light sources are located on opposite sides of the imaging axis.

5. The system as defined in claim 4, wherein the first and second light sources are each located at an angle of at least fifteen degrees relative to the imaging axis.

6. The system as defined in claim 1, wherein the first light source comprises a first plurality of light emitting diodes.

7. The system as defined in claim 6, wherein the second light source comprises a second plurality of light emitting diodes.

8. The system as defined in claim 1, wherein the controller controls the first and second light sources to turn on only one of the first and second light sources at a time.

9. The system as defined in claim 1, wherein the controller alternates activation of the first and second light sources.

10. An active illumination vehicle eye monitoring system for monitoring an eye of a person in a vehicle, said system comprising:
- a video imaging camera located on a vehicle and oriented to generate images of a subject eye of a person in the vehicle;
- a first light source located on the vehicle and arranged along a first axis for illuminating the eye;
- a second light source located on the vehicle and arranged along a second axis offset from the first axis for illuminating the eye; and
- a controller for processing the images generated with the video imaging camera during illumination of the subject eye and controlling operation of the first and second light sources, said controller detecting presence of sufficient glare based on a threshold brightness and controlling activation of the first and second light sources to reduce the glare when the presence of sufficient glare is detected from an eye region of the person, wherein the controller turns off one of the first and second light sources in response to the detection of sufficient glare to reduce the glare.

11. The system as defined in claim 10, wherein the video imaging camera has an imaging axis and the first and second light sources are located on opposite sides of the imaging axis.

12. The system as defined in claim 11, wherein the first and second light sources are each located at an angle of at least fifteen degrees relative to the imaging axis.

13. The system as defined in claim 10, wherein the first light source comprises a first plurality of light emitting diodes.

14. The system as defined in claim 13, wherein the second light source comprises a second plurality of light emitting diodes.

15. The system as defined in claim 10, wherein the controller controls the first and second light sources to turn only one of the first and second light sources on at a time.

16. The system as defined in claim 10, wherein the controller alternates activation of the first and second light sources.

17. A method for actively illuminating and monitoring a subject, said method comprising the steps of:
- arranging a video imaging camera to generate images of a subject;
- arranging a first light source at a first location;
- arranging a second light source at a second location;
- illuminating the subject with light generated by the first light source;
- generating a first image of the subject while the subject is illuminated with light from the first light source;
- detecting the presence of sufficient glare based on a threshold brightness; and
- controlling the first and second light sources to reduce the light provided by the first light source when sufficient glare is detected from an eye region of the subject, wherein the first light source is controlled to reduce light by turning the first light source off in response to the detection of sufficient glare.

18. The method as defined in claim 17, wherein the subject comprises an eye.

19. The method as defined in claim 18, wherein the method is employed for monitoring the eye of a driver of a vehicle.

20. The method as defined in claim 17, wherein the steps of arranging the video imaging camera, first light source, and second light source comprises arranging the video imaging camera on an imaging axis, arranging the first light source on one side of the imaging axis and arranging the second light source on an opposite side of the imaging axis.

21. The method as defined in claim 20, wherein the steps of arranging the first and second light sources further comprises arranging the first and second light sources at an angle of at least fifteen degrees relative to the imaging axis.

22. The method as defined in claim 17, wherein the step of arranging a video imaging camera comprises arranging only a single video imaging camera to generate images of a subject's face that may be illuminated by both the first and second light sources.

23. The system as defined in claim 1, wherein the video image camera generates images of a subject that may be illuminated by both the first and second light sources.

24. The system as defined in claim 10, wherein the video image camera generates images of a subject that may be illuminated by both the first and second light sources.

* * * * *